United States Patent
Hogan et al.

(10) Patent No.: US 8,938,702 B1
(45) Date of Patent: Jan. 20, 2015

(54) TIMING DRIVEN ROUTING FOR NOISE REDUCTION IN INTEGRATED CIRCUIT DESIGN

(71) Applicant: International Business Machines Corporation, Armonk, NY (US)

(72) Inventors: Andre Hogan, Hopewell Junction, NY (US); Andrew D. Huber, Poughkeepsie, NY (US); Zhuo Li, Cedar Park, TX (US); Karsten Muuss, Niederkassel (DE); Sven Peyer, Tuebingen (DE); Christian Schulte, Boblingen (DE); Gustavo E. Tellez, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/134,039

(22) Filed: Dec. 19, 2013

(51) Int. Cl.
*G06F 17/50* (2006.01)

(52) U.S. Cl.
CPC ................................ *G06F 17/5031* (2013.01)
USPC ........................... 716/113; 716/115; 716/134

(58) Field of Classification Search
USPC .......................................... 716/113, 115, 134
See application file for complete search history.

(56) References Cited

U.S. PATENT DOCUMENTS

| | | | |
|---|---|---|---|
| 6,279,142 B1 | 8/2001 | Bowen et al. | |
| 6,480,998 B1 | 11/2002 | Mukherjee et al. | |
| 7,062,737 B2 | 6/2006 | Tetelbaum et al. | |
| 7,739,630 B1 | 6/2010 | Chen et al. | |
| 7,784,010 B1 * | 8/2010 | Balsdon et al. | 716/118 |
| 8,095,903 B2 | 1/2012 | Birch et al. | |
| 8,386,985 B2 | 2/2013 | Alpert et al. | |
| 8,423,940 B2 | 4/2013 | Daellenbach et al. | |
| 8,495,544 B2 | 7/2013 | Celik et al. | |
| 2004/0041281 A1 | 3/2004 | Sakai et al. | |
| 2006/0281221 A1 | 12/2006 | Mehrotra et al. | |
| 2008/0313588 A1 | 12/2008 | Buehler et al. | |
| 2010/0333054 A1 | 12/2010 | Ishikawa | |
| 2012/0110539 A1 | 5/2012 | Birch et al. | |
| 2012/0254816 A1 | 10/2012 | Brink et al. | |

OTHER PUBLICATIONS

Hua, Hao et al., "Pre-route Net Classing for Crosstalk Avoidance", Department of Electrical and Computer Engineering, North Carolina State University, 2005, 8 pages.
Tseng, Hsiao-Ping et al., "Timing and Crosstalk Driven Area Routing", Proceedings of ACM/IEEE Design Automation Conference, 1998, 4 pages.

* cited by examiner

*Primary Examiner* — Sun Lin
(74) *Attorney, Agent, or Firm* — Stephen R. Tkacs; Stephen J. Walder, Jr.; William J. Stock

(57) ABSTRACT

A mechanism is provided in a data processing system for timing-driven routing for noise reduction in integrated circuit design. Responsive to performing timing driving routing on an integrated circuit design, the mechanism identifies a set of noise-critical nets in the integrated circuit design. The mechanism performs timing driven routing on the integrated circuit design with noise constraints based on the set of noise-critical nets.

20 Claims, 4 Drawing Sheets

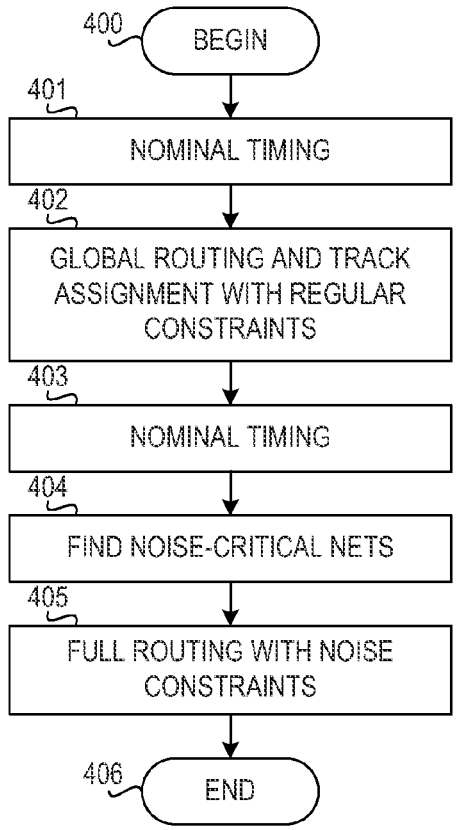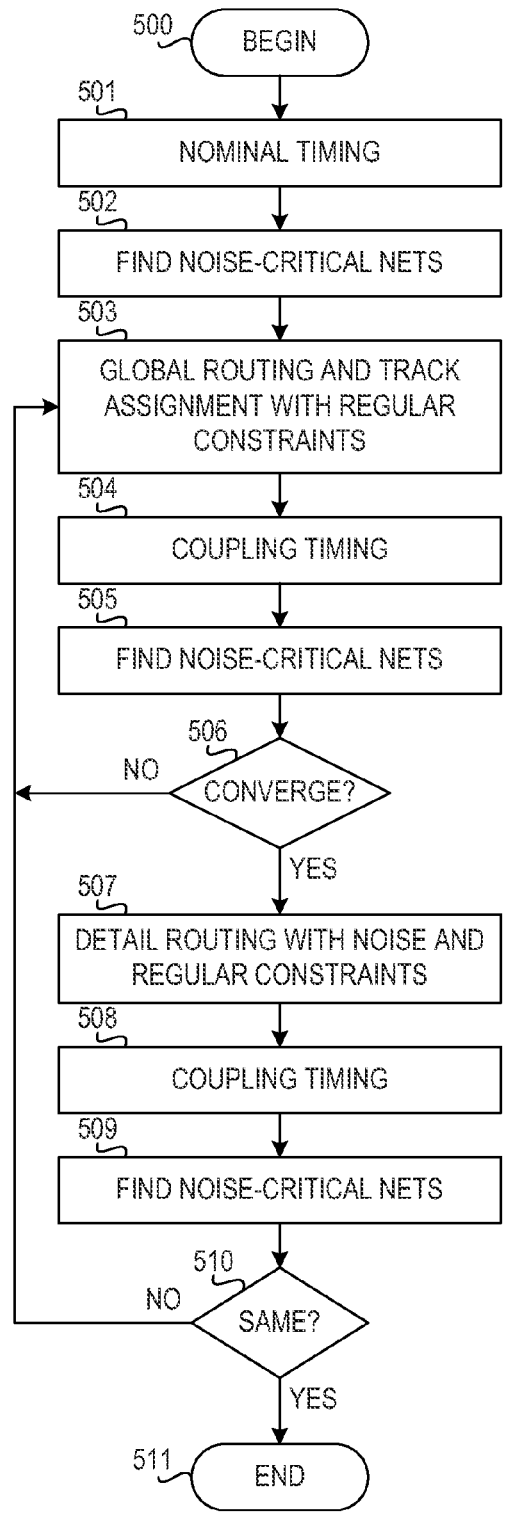

FIG. 6

| DESIGN | FLOW | WSLK | FOM | NEG | WL | SLEW V | CAP V |
|---|---|---|---|---|---|---|---|
| 1 | BASELINE | -227 | -97837 | 2584 | 56.58M | 1957 | 17353 |
| 1 | NOISE | -141 | -18715 | 502 | 56.83M | 1565 | 14362 |
| 2 | BASELINE | -208 | -208744 | 4679 | 56.03M | 1928 | 18661 |
| 2 | NOISE | -162 | -10641 | 421 | 56.26M | 1355 | 13146 |
| 3 | BASELINE | -349 | -524470 | 9092 | 91.57M | 6466 | 30495 |
| 3 | NOISE | -398 | -265916 | 5079 | 91.81M | 5642 | 26284 |
| 4 | BASELINE | -585 | -1550590 | 19764 | 135.39M | 8654 | 61524 |
| 4 | NOISE | -679 | -816660 | 11736 | 135.53M | 6507 | 55960 |

TIMING DRIVEN ROUTING FOR NOISE REDUCTION IN INTEGRATED CIRCUIT DESIGN

BACKGROUND

The present application relates generally to an improved data processing apparatus and method and more specifically to mechanisms for timing driven routing for noise reduction in an integrated circuit design.

Modern day electronics include components that use integrated circuits (ICs). Integrated circuits are electronic circuits formed using Silicon as a substrate and by adding impurities to form solid-state electronic devices, such as transistors, diodes, and resistors. Commonly known as a "chip," an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as by amplifying, filtering, or mixing the signals, and produce an analog or digital output. Generally, any type of circuit can be designed as an IC.

Logical synthesis, physical synthesis, and generation of a routed and timing closed design are some of the functions of an IC design software tool. Logical synthesis is the process of designing the logical operation that is to be achieved by a circuit. Physical synthesis is the mapping, translating, or integration of that logical synthesis to the physical design components, such as logic gate and buffer circuits. Routing and timing closed design is the design produced by adjusting the wire routings and component placements in a design so that the design meets certain design criteria, such as delay or slew of signals, or wirelength restrictions.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry. An interconnected group of components is called a "net."

The software tools manipulate these components at the component level or at the block level. A block of components is also known as a global cell, or g-cell. A g-cell in an IC design is a portion of the IC design. One way of identifying g-cells in an IC design is to overlay a grid of imaginary vertical and horizontal lines on the design, and deeming each portion of the IC design bound by horizontal and vertical lines as a g-cell. The horizontal or vertical lines bounding a g-cell are called cut-lines.

Imposing such a grid on an IC design abstracts the global routing problem away from the actual wire implementation and gives a more mathematical representation of the task. A net may span one or more g-cells and may cross several cut lines.

An IC design software tool can, among other functions, manipulate cells or interconnect components of one cell with components of other cells to form nets. These cells are different from g-cells in that these cells are the actual logic components, such as the semiconductor gates. Interconnects between components are called wires. A wire is a connection between parts of electronic components and is formed using a metallic material that conducts electricity.

A placement problem is a problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement. A wire can be designed to take any one of several available paths in a design. Placement of a wire on a certain path, or track, is a part of routing.

A layer is typically designated to accommodate wires of a certain width (wire code). Generally, the wider the wire width of a layer or higher the height of a layer, the faster the signal propagation speed for the net routed on that layer. Faster layers, i.e., layers with larger wire widths and wire height, can accommodate fewer components or nets as compared to slower layers with narrower wire widths.

A router is a component of an IC design tool that performs the routing function. Once the placement component, known as a placer, has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

A global router divides the routing region into g-cells and attempts to route nets through the g-cells such that no g-cell overflows its capacity. Global routing is the process of connecting a g-cell to other g-cells.

After global routing, wires must be assigned to actual tracks within each tile, followed by detail routing, which must connect each global route to the actual pin shape on the cell. Another type of router, known as the detailed router, performs the detailed routing. The global and detailed routing produced during the design process are collectively referred to as "routing" and are usually further modified during optimization of the design.

SUMMARY

In one illustrative embodiment, a method, in a data processing system, is provided for timing-driven routing for noise reduction in integrated circuit design. The method comprises responsive to performing timing driven routing on an integrated circuit design, identifying a set of noise-critical nets in the integrated circuit design. The method further comprises performing timing driven routing on the integrated circuit design with noise constraints based on the set of noise-critical nets.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a mechanism for performing timing driven routing for noise reduction in an integrated circuit design in accordance with an illustrative embodiment;

FIG. 5 is a flowchart illustrating operation of a mechanism for performing an iterative routing flow for timing driven routing for noise reduction in an integrated circuit design in accordance with an illustrative embodiment;

FIG. 6 is a table illustrating results from timing driven routing for noise reduction in an integrated circuit design in accordance with the illustrative embodiments.

DETAILED DESCRIPTION

Figure 1A:
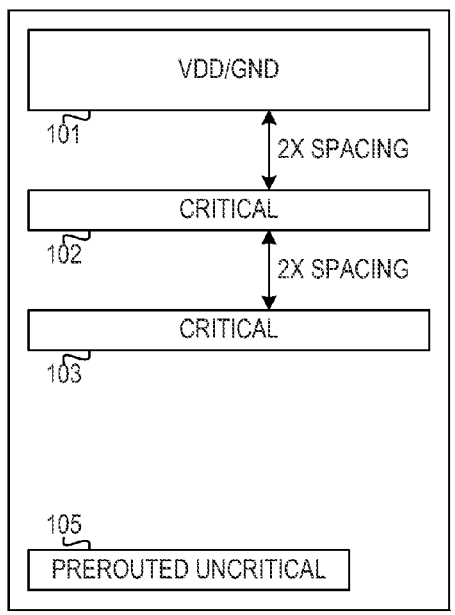
FIGS. 1A and 1B depict a two-step 2× routing based spread technique in accordance with an illustrative embodiment.

The illustrative embodiments provide a mechanism for timing driven routing for noise reduction in integrated circuit design. Previous timing routing techniques ignored noise and coupling problems and generated a solution with good timing without coupling noise; however, after the coupling and noise analysis, the timing of many nets become worse and takes significant runtime for the designer to manually fix the problem or run expensive post optimization under coupling timing environment, which increases flow runtime and adds significant power.

In current technology trends, metals become narrower and higher, and the ratio between coupling capacitance/ground capacitance increases. For higher frequency designs with shorter cycles, more nets have timing window overlap. When the technology goes to 16/14/10 nm, and the standard cell row height is 9 track or 10 track, it will make things even worse.

The illustrative embodiments propose a new routing technique that adds wire spacing between "critical nets," which are more sensitive to coupling problems. In other words, noise-critical nets are more likely to be susceptible to noise between each other. The illustrative embodiments propose several mechanisms to add space between critical nets with different timing/routing/runtime tradeoff. Also, the illustrative embodiments present several mechanisms to select the critical nets that will be passed to the routing routine based on slack from Steiner/Global/full detail routing, the sensitivity of net to capacitance, the layer range, the wirecode, and the wirelength.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

In one embodiment, the illustrative embodiments provide a mechanism for selecting noise-critical nets. The mechanism identifies the following nets as noise-critical: nets with negative coupling slack after full detail routing; nets with global routing congestion higher than a predetermined percentage; nets longer than a predetermined wirelength; nets within a top predetermined percentage ranked by slack, even if all nets have positive slack (if a net is positive under normal timing mode, with Steiner/global/detail route, but close to the slack threshold, it may still be sensitive to the coupling); nets with wirecode where the spacing is less than the wire width; nets with no or lower level plane keywords or routed on lower metal layers, which are more sensitive to coupling; or any combination of the above. Uplift is an internal term for noise and coupling anlaysis. A Steiner route is a shortest length tree connecting all cells, without considering congestion or real routing, so it is a lower bound of routing topology.

Figure 1B:
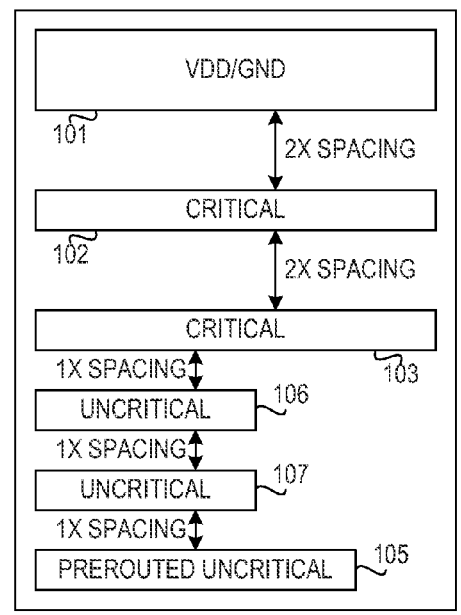

FIGS. 1A and 1B depict a two-step 2× routing based spread technique in accordance with an illustrative embodiment. The mechanism of the illustrative embodiment runs the router on the noise-critical nets with an enlarged (2×) spacing/pitch constraint and then runs the router on the rest of the nets with original spacing constraints.

More particularly, in the first step shown in FIG. 1A, the supply voltage (VDD) or ground (GND) reference wire 101 and the pre-routed uncritical net 105 are placed. The critical nets 102, 103 are placed with 2× spacing. That is, the spacing between the VDD/GND reference wire 101 and critical net 102 is twice the width of the wire, and the spacing between critical net 102 and critical net 103 is twice the width of the wire.

In the depicted example, pre-routed uncritical net 105 is not sensitive to coupling noise; however, critical nets 102, 103 are more susceptible to noise between each other. Critical nets 102, 103 may be more susceptible to noise because they are long wires, and have high potential to have timing window overlaps, which have more capacitive impact.

In a second step shown in FIG. 1B, uncritical nets 106, 107 are placed with original spacing constraints. In the depicted example, uncritical nets 106, 107 between the critical net 103 and pre-routed uncritical net 105. More specifically, the spacing between critical net 103 and uncritical net 106 is the same width as the wire, the spacing between uncritical net 106 and uncritical net 107 is the same width as the wire, and the spacing between uncritical net 107 and pre-routed uncritical net 105 is the same width as the wire.

Figure 2A:
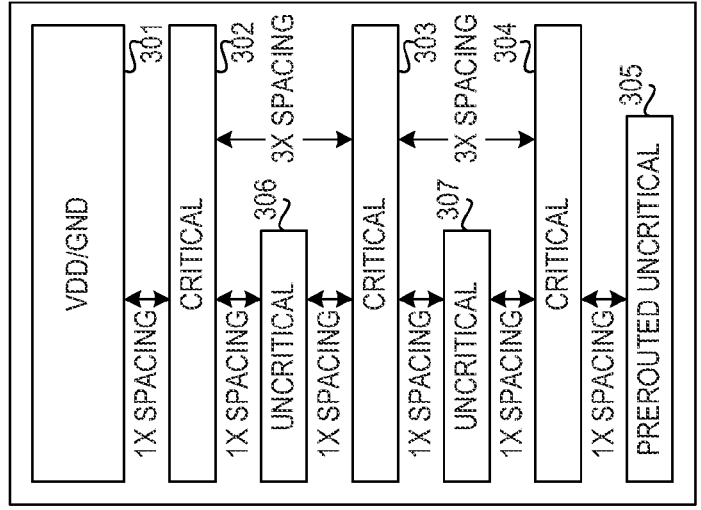
FIGS. 2A and 2B depict a two-step 3× routing based spread technique in accordance with an illustrative embodiment.
Figure 2B:
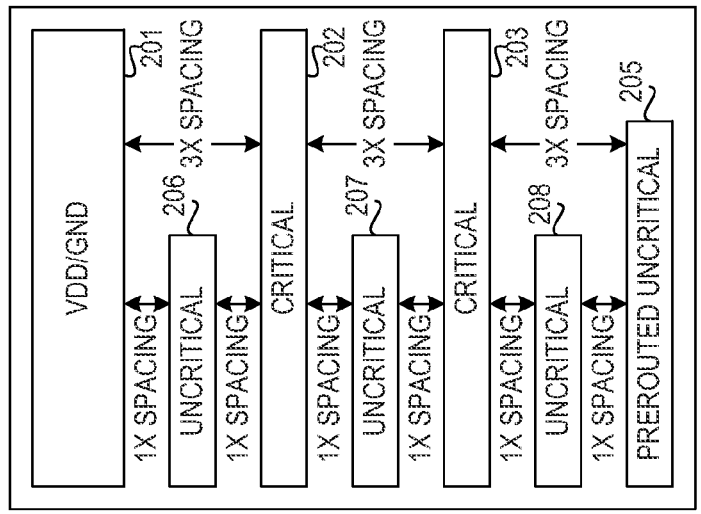

FIGS. 2A and 2B depict a two-step 3× routing based spread technique in accordance with an illustrative embodiment. The mechanism of the illustrative embodiment runs the router on the noise-critical nets with an enlarged (3×) spacing/pitch constraint and then runs the router on the rest of the nets with original spacing constraints.

More particularly, in the first step shown in FIG. 2A, the supply voltage (VDD) or ground (GND) reference wire 201 and the pre-routed uncritical net 205 are placed. The critical nets 202, 203 are placed with 3× spacing. That is, the spacing between the VDD/GND reference wire 201 and critical net 202 is three times the width of the wire, the spacing between critical net 202 and critical net 203 is three times the width of the wire, and the spacing between critical net 203 and pre-routed uncritical net 205 is three times the width of the wire.

In a second step shown in FIG. 2B, uncritical nets 206-208 are placed with original spacing constraints. In the depicted example, uncritical net 206 is placed between VDD/GND reference wire 201 and critical net 202, uncritical net 207 is placed between critical net 202 and critical net 203, and uncritical net 208 is placed between critical net 203 and pre-routed uncritical net 205. In the depicted example, uncritical nets 206-208 are placed with 1× spacing. More specifically, the spacing between VDD/GND wire 201 and uncritical net 206 is the same width as the wire, the spacing between uncritical net 206 and critical net 202 is the same width as the wire, and so forth.

Figure 3:
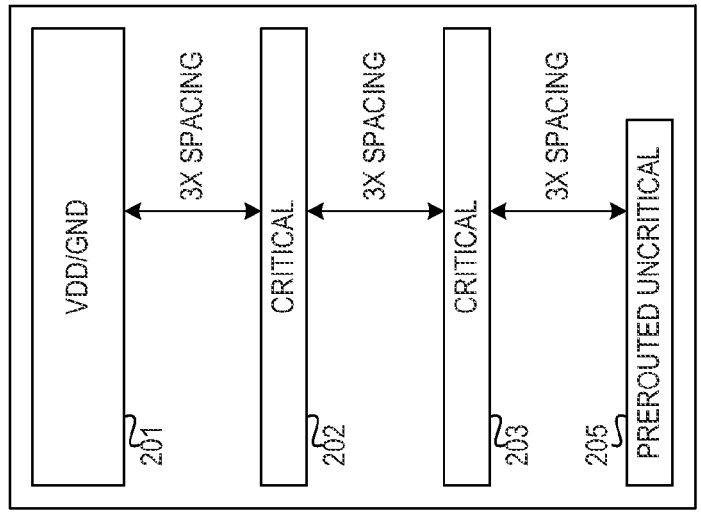
FIG. 3 depicts a one-step group-to-group routing based spread technique in accordance with an illustrative embodiment.

FIG. 3 depicts a one-step group-to-group routing based spread technique in accordance with an illustrative embodiment. The mechanism of the illustrative embodiment performs a group-to-group constraint routing approach by assigning a new wiretype to the set of noise-critical nets and running the router for all nets in one step. In the depicted example, critical nets 302-304 are routed with 3× spacing. That is, the spacing between critical net 302 and critical net 303 and between critical net 303 and critical net 304 is three times the width of the wire. The spacing between the VDD/GND wire 301 and critical net 302 is the 1× or the same as the width of the wire, and the spacing between critical net 304 and pre-routed uncritical net 305 is 1×. Uncritical nets 306, 307 are also routed with 1× spacing.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 4 is a flowchart illustrating operation of a mechanism for performing timing driven routing for noise reduction in an integrated circuit design in accordance with an illustrative embodiment. Operation begins (block 400), and the mechanism performs nominal (non-coupling) timing on the integrated circuit design (block 401). The mechanism then performs global routing and track assignment with regular constraints (block 402). The mechanism again performs nominal timing (block 403). Then, the mechanism finds noise-critical nets (block 404). The mechanism then performs full routing with noise constraints (block 405). Thereafter, operation ends (block 406). Nominal timing is the timing analysis without noise or coupling impact. Track assignment is a step between global routing and detail routing that assigns the global wires to the correspoinding routing tracks in a gcell, but without finishing all pin connections.

FIG. 5 is a flowchart illustrating operation of a mechanism for performing an iterative routing flow for timing driven routing for noise reduction in an integrated circuit design in accordance with an illustrative embodiment. The flow combines timing analysis (normal or uplift), noise-critical net selection, regular net selection, noise-aware global/detail routing with layer range, and target ratio and priority constraints with a plurality of iterations. The target ratio and priority constraints may be a two-step approach, or a group-to-group constraint approach. Target ratio is an ideal ratio of "real wirelength" and "ideal wirelength."

Operation begins (block 500), and the mechanism performs normal timing (block 501). Then, the mechanism finds noise-critical nets (block 502). Next, the mechanism performs global routing and track assignment with regular constraints (block 503). The mechanism performs coupling timing (block 504). The mechanism then finds noise-critical nets (block 505). The mechanism determines whether the noise-critical nets converge (block 506).

Coupling timing refers to a timing analysis with noise and coupling analysis. For example, when an interconnect network is extracted, generally the capacitance is modeled as the self capacitance plus coupling capacitance versus other nets. This model refers to a nominal timing, since the coupling capacitance extraction does not consider the timing window overlap of aggressor (nets close to victim nets) and victim nets (current net). However, when one starts to look at the slew and timing window between aggressor and victim nets, then the default coupling capacitance between two nets may get multiplied by a constant factor (>1), and increase the delay of victim nets. Noise-critical nets converge if the mechanism finds K noise-critical nets and after a set of operations using the same method, the mechanism finds the same K nets, or the difference of new set of nets and previous one is very small. So it could be either no change or a defined threshold between new nets and old nets. If the noise-critical nets do not converge, operation returns to block 503 to perform global routing and track assignment with regular constraints. The inner loop of blocks 503-506 iterates until the noise-critical nets converge in block 506.

If the noise-critical nets converge in block 506, the mechanism performs detail routing with noise and regular constraints (block 507). The mechanism then performs coupling timing (block 508). The mechanism finds noise-critical nets (block 509). The mechanism then determines whether the noise-critical nets found in block 509 are the same as the noise-critical nets found in the last iteration of block 505 (block 510). If the noise-critical nets are not the same, operation returns to block 503 to perform global routing and track assignment with regular constraints. The outer loop of blocks 503-510 iterates until the noise-critical nets are the same in block 510. Thereafter, operation ends (block 511).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 is a table illustrating results from timing driven routing for noise reduction in an integrated circuit design in accordance with the illustrative embodiments. The table shows four different integrated circuit designs with metrics for a baseline using normal constraints and for noise constraints from global routing and a two-step approach. As seen in FIG. 6, the routing with noise constraints results in improvement in worst slack (WSLK) for designs 1 and 2; however WSLK is worse for designs 3 and 4. The slack associated with each connection is the difference between the required time and the arrival time. A positive slack at a node implies that the arrival time at that node may be increased without affecting the overall delay of the circuit. Conversely, negative slack implies that a path is too slow, and the path must be sped up (or the reference signal delayed) if the whole circuit is to work at the desired speed.

The feature of merit (FOM) is the sum of all negative slack. The table also shows the number of nodes with negative slack (NEG). As seen in the table of FIG. 6, the routing with noise constraints results in greatly improved FOM and NEG metrics. Also shown in the table of FIG. 6, routing with noise constraints has very little effect on wirelength (WL), but results in improvement in slew and capacitance. Slew V refers to the total number of slew violations in the design and CAP V refers to the total number of capacitance violations in the design. For slew violations, one measures at the input of any gate and checks the real arrival stew and the max slew range. For capacitance violations, one compares the current capacitive load of a given gate and the max load a gate can drive.

The illustrative embodiments may be utilized in many different types of data processing environments. In order to provide a context for the description of the specific elements and functionality of the illustrative embodiments, FIG. 6 is provided hereafter as an example environment in which aspects of the illustrative embodiments may be implemented. It should be appreciated that FIG. 6 is only an example and is not intended to assert or imply any limitation with regard to the environments in which aspects or embodiments of the present invention may be implemented. Many modifications to the depicted environments may be made without departing from the spirit and scope of the present invention.

Figure 7:
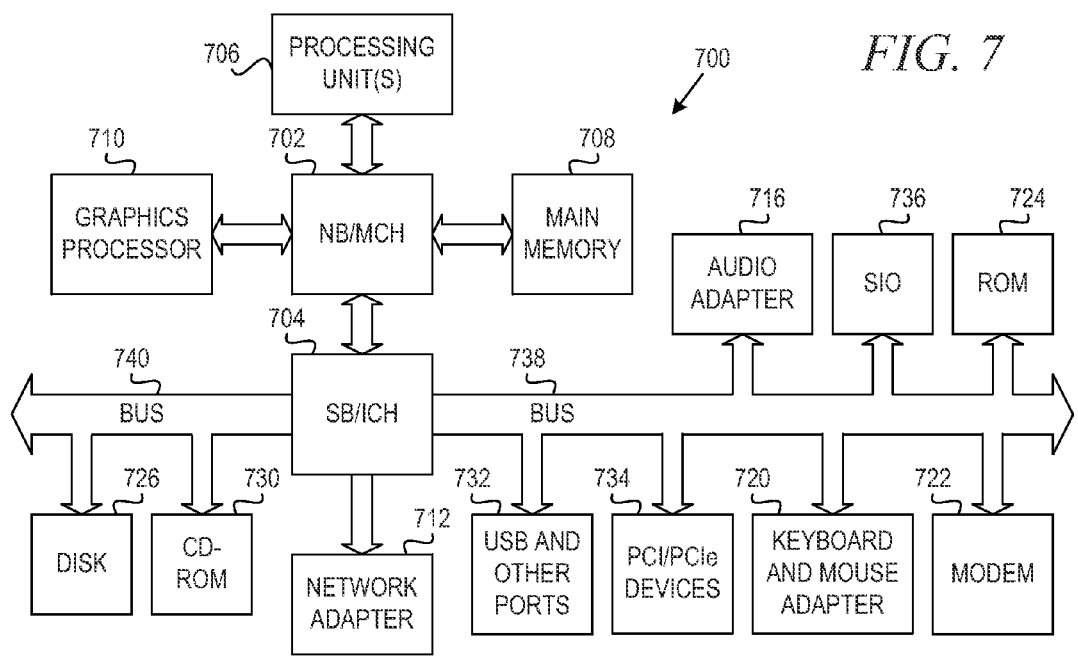
FIG. 7 is a block diagram of an example data processing system in which aspects of the illustrative embodiments may be implemented.

FIG. 7 is a block diagram of an example data processing system in which aspects of the illustrative embodiments may be implemented. Data processing system 700 is an example of a computer in which computer usable code or instructions implementing the processes for illustrative embodiments of the present invention may be located.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 may be connected to NB/MCH 202 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft® Windows7®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, executed in a data processing system, for timing-driven routing for noise reduction in an integrated circuit design, the method comprising:

responsive to performing a timing driven routing on an integrated circuit design, identifying a first set of noise-critical nets in the integrated circuit design based on the timing driven routing;

performing an iterative routing on the integrated circuit design comprising:

iteratively performing a global routing and track assignment and a coupling timing on the integrated circuit design and, in response, identifying a second set of noise-critical nets in the integrated circuit design until the second set of noise-critical nets converges;

performing a detail routing on the integrated circuit design with noise constraints and regular constraints;

performing the coupling timing on the integrated circuit design to form a modified integrated circuit design; and identifying a third set of noise-critical nets in the integrated circuit design; and responsive to determining that the third set of noise-critical nets and the second set of noise critical nets are equivalent, outputting the modified integrated circuit design.

2. The method of claim 1, wherein performing the detail routing on the integrated circuit design with noise constraints comprises increasing required spacing for pairs of critical net wires.

3. The method of claim 1, wherein performing the detail routing on the integrated circuit design with noise constraints comprises:

performing a two-step routing approach by running the router on the set of noise-critical nets with enlarged spacing and pitch constraints and running the router on the remaining nets in the integrated circuit design with original spacing constraints.

4. The method of claim 1, wherein performing the detail routing on the integrated circuit design with noise constraints comprises:

performing a group-to-group constraint routing approach by assigning a new wiretype to the set of noise-critical nets and running a router for all nets in one step.

5. The method of claim 1, further comprising responsive to determining that the third set of noise-critical nets and the second set of noise-critical nets are not equivalent, repeating the iterative routing until the second set of noise-critical nets and the third set of noise-critical nets are equivalent.

6. The method of claim 5, wherein the iterative routing further comprises applying target ratio constraints and priority constraints, wherein applying the target ratio constraints and the priority constraints comprises a two-step approach or a group-to-group constraint approach.

7. The method of claim 1, wherein identifying a set of noise-critical nets in an integrated circuit design comprises identifying a combination of the following:

nets with negative uplift coupling slack after full detail routing;

nets with global routing congestion higher than a predetermined percentage;

nets with wirelength longer than a predetermined length;

nets within a predetermined top percentage ranked by slack, even with all nets having positive slack;

nets with wirecode having spacing less than width; or nets with no or lower level plane keywords or routed on lower metal layers.

8. A computer program product comprising a non-transitory computer readable storage medium having a computer readable program stored therein, wherein the computer readable program, when executed on a computing device, causes the computing device to:

responsive to performing a timing driven routing on an integrated circuit design, identify a first set of noise-critical nets in the integrated circuit design based on the timing driven routing;

perform an iterative routing on the integrated circuit design comprising:

iteratively perform a global routing and track assignment and a coupling timing on the integrated circuit design and, in response, identifying a second set of noise-critical nets in the integrated circuit design until the second set of noise-critical nets converges;

perform a detail routing on the integrated circuit design with noise constraints and regular constraints;

perform the coupling timing on the integrated circuit design to form a modified integrated circuit design; and identify a third set of noise-critical nets in the integrated circuit design; and responsive to determining that the third set of noise-critical nets and the second set of noise critical nets are equivalent, output the modified integrated circuit design.

9. The computer program product of claim 8, wherein performing the detail routing on the integrated circuit design with noise constraints comprises increasing required spacings for pairs of critical net wires.

10. The computer program product of claim 8, wherein performing the detail routing on the integrated circuit design with noise constraints comprises:

performing a two-step routing approach by running the router on the set of noise critical nets with enlarged spacing and pitch constraints and running the router on the remaining nets in the integrated circuit design with original spacing constraints.

11. The computer program product of claim 8, wherein performing the detail routing on the integrated circuit design with noise constraints comprises:

performing a group-to-group constraint routing approach by assigning a new wiretype to the set of noise-critical nets and running a router for all nets in one step.

12. The computer program product of claim 8, wherein the computer readable program further causes the computing device to responsive to determining that the third set of noise-critical nets and the second set of noise-critical nets are not equivalent, repeat the iterative rotating until the second set of noise-critical nets and the third set of noise-critical nets are equivalent.

13. The computer program product of claim 12, wherein the iterative routing further comprises applying target ratio constraints and priority constraints, wherein applying the target ratio constraints and the priority constraints comprises a two-step approach or a group-to-group constraint approach.

14. The computer program product of claim 8, wherein identifying a set of noise-critical nets in an integrated circuit design comprises identifying a combination of the following:

nets with negative uplift coupling slack after full detail routing;

nets with global routing congestion higher than a predetermined percentage;

nets with wirelength longer than a predetermined length;

nets within a predetermined top percentage ranked by slack, even with all nets having positive slack;

nets with wirecode having spacing less than width; or nets with no or lower level plane keywords or routed on lower metal layers.

15. An apparatus comprising:

a processor; and a memory coupled to the processor, wherein the memory comprises instructions which, when executed by the processor, cause the processor to:

responsive to performing timing driven routing on an integrated circuit design, identify a set of noise-critical nets in the integrated circuit design; and perform an iterative routing on the integrated circuit design comprising:

iteratively perform a global routing and track assignment and a coupling timing on the integrated circuit design and, in response, identifying a second set of noise-critical nets in the integrated circuit design until the second set of noise-critical nets converges;

perform a detail routing on the integrated circuit design with noise constraints and regular constraints;

perform the coupling timing on the integrated circuit design to form a modified integrated circuit design; and identify a third set of noise-critical nets in the integrated circuit design; and responsive to determining that the third set of noise-critical nets and the second set of noise critical nets are equivalent, output the modified integrated circuit design.

16. The apparatus of claim 15, wherein performing the detail routing on the integrated circuit design with noise constraints comprises increasing required spacings for pairs of critical net wires.

17. The apparatus of claim 15, wherein performing the detail, routing on the integrated circuit design with noise constraints comprises:

performing a two-step routing approach by running the router on the set of noise-critical nets with enlarged spacing and pitch constraints and running the router on the remaining nets in the integrated circuit design with original spacing constraints.

18. The apparatus of claim 15, wherein performing the detail routing on the integrated circuit design with not constraints comprises:

performing a group-to-group constraint routing approach by assigning a new wiretype to the set of noise-critical nets and running a router for all nets in one step.

19. The apparatus of claim 15, wherein the instructions further cause the processor to responsive to determining that the third set of noise-critical nets and the second set of noise-critical nets are not equivalent, repeating the iterative routing until the second set of noise-critical nets and the third set of noise-critical nets are equivalent.

20. The apparatus of claim 15, wherein identifying a set of noise-critical nets in an integrated circuit design comprises identifying a combination of the following:

nets with negative uplift coupling slack after full detail routing;

nets with global routing congestion higher than a predetermined percentage;

nets with wirelength longer than a predetermined length;

nets within a predetermined top percentage ranked by slack, even with all nets having positive slack;

nets with wirecode having spacing less than width; or nets with no or lower level plane keywords or routed on to lower metal layers.

\* \* \* \* \*